July 9, 1935.    J. F. STEPHENS    2,007,910
CONVEYING APPARATUS
Filed Feb. 18, 1932    5 Sheets-Sheet 1
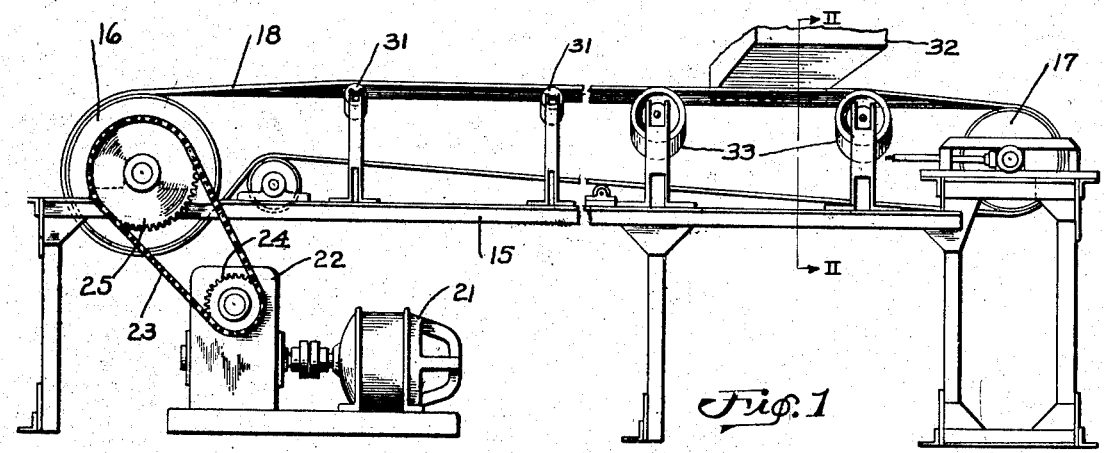
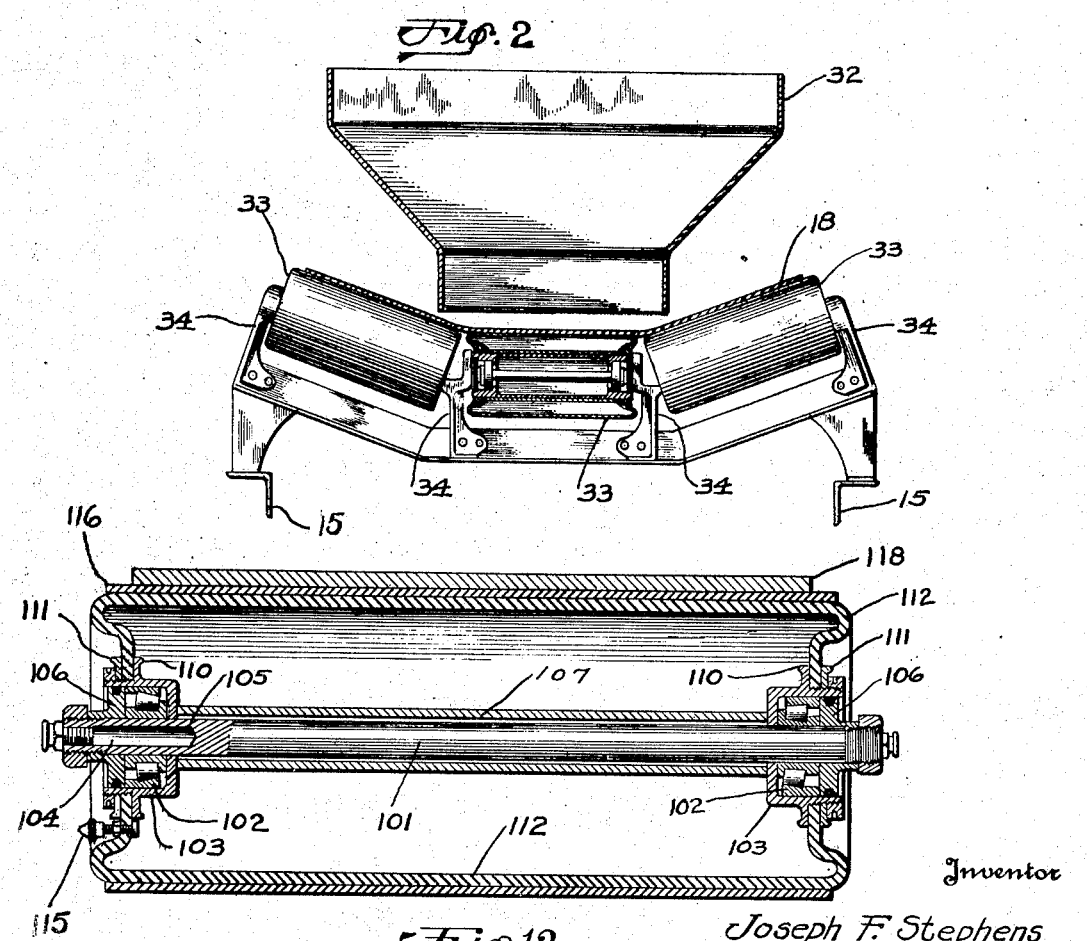
Inventor
Joseph F. Stephens
By
Attorney July 9, 1935. J. F. STEPHENS 2,007,910
CONVEYING APPARATUS
Filed Feb. 18, 1932   5 Sheets-Sheet 2

Inventor
Joseph F. Stephens
By
Attorney

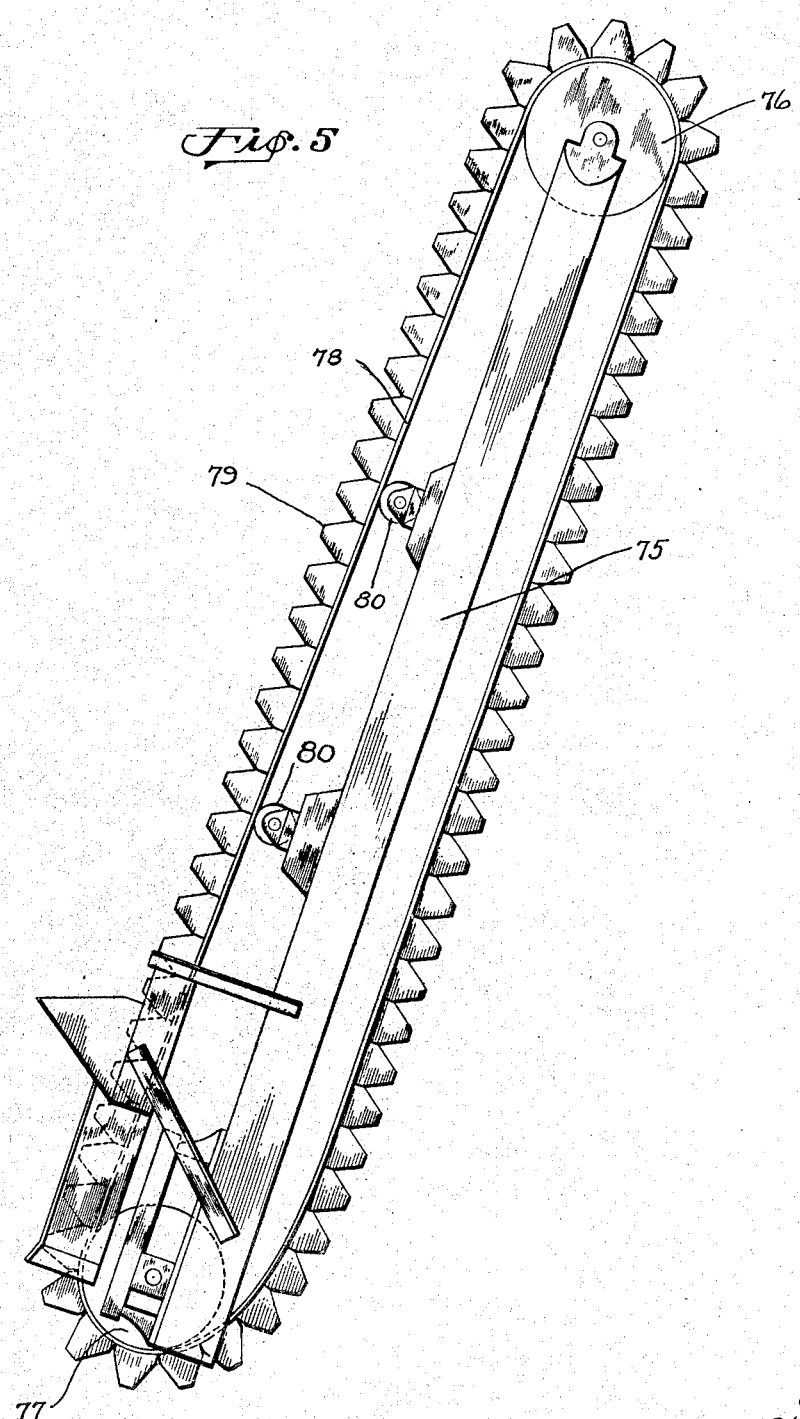

July 9, 1935.   J. F. STEPHENS   2,007,910
CONVEYING APPARATUS
Filed Feb. 18, 1932   5 Sheets-Sheet 4
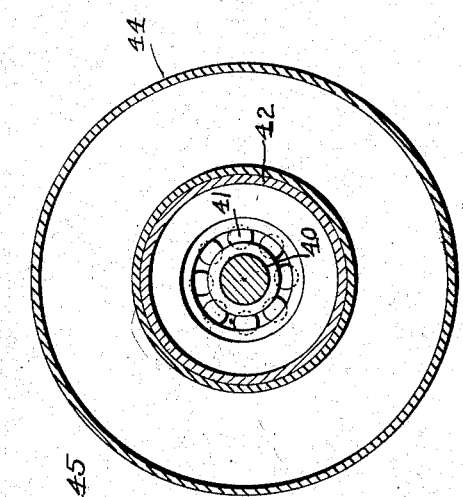
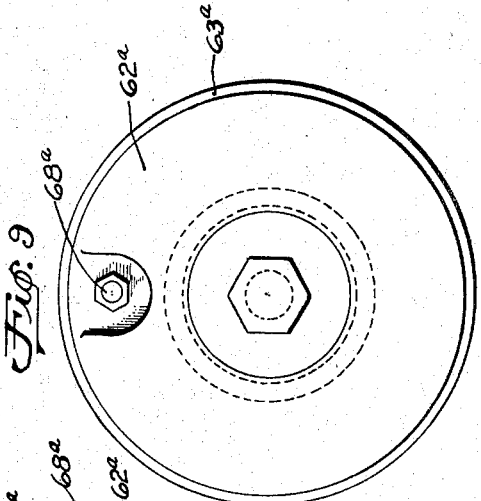
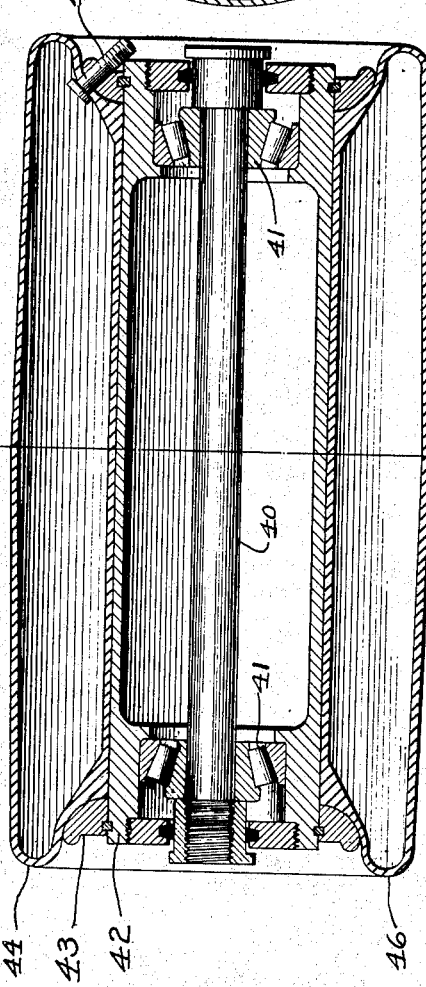
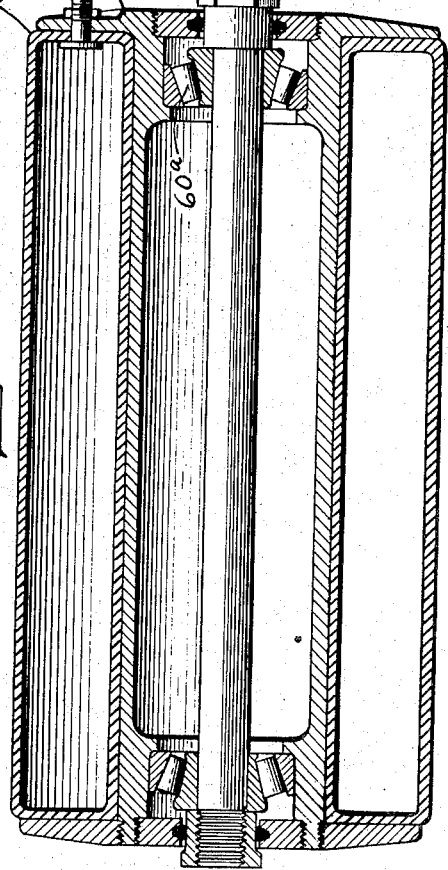
Inventor
Joseph F. Stephens
By
Attorney

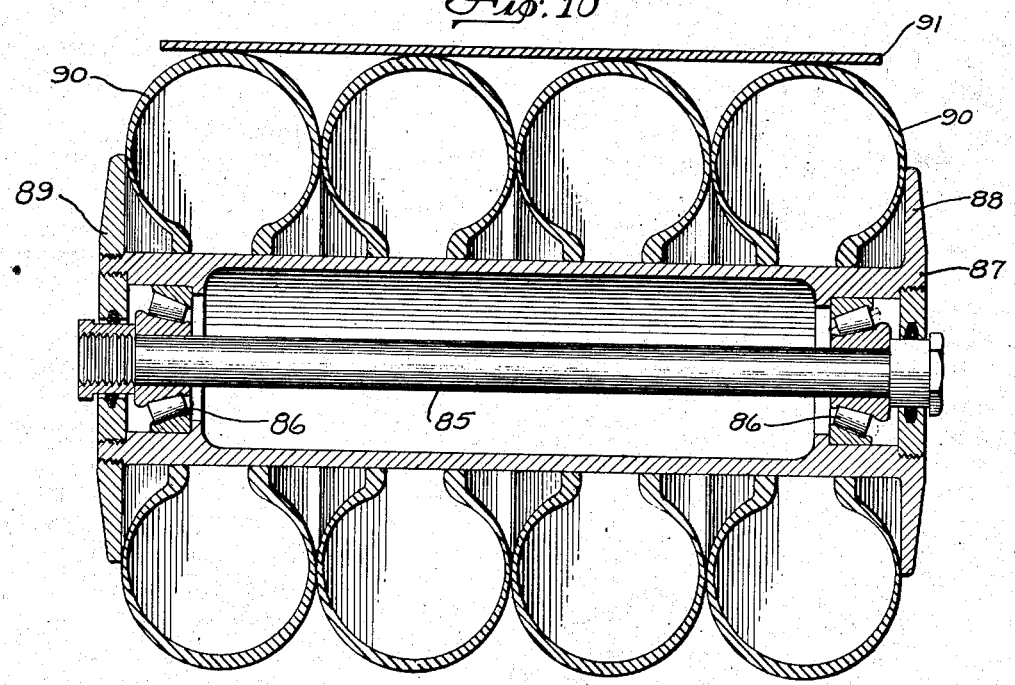
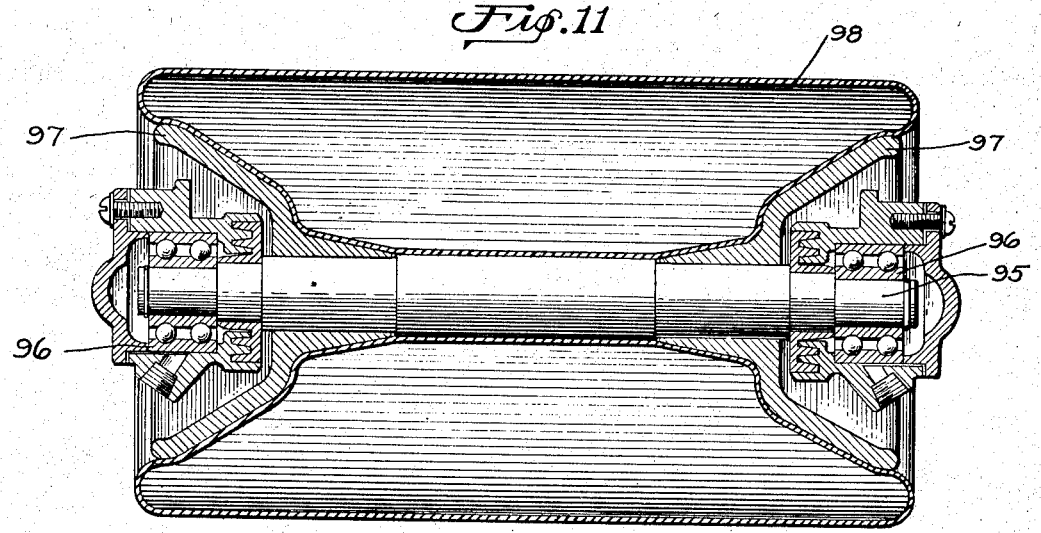

Patented July 9, 1935

2,007,910

UNITED STATES PATENT OFFICE 2,007,910

CONVEYING APPARATUS

Joseph F. Stephens, Akron, Ohio, assignor to Wingfoot Corporation, Akron, Ohio, a corporation of Delaware Application February 18, 1932, Serial No. 593,747

2 Claims. (Cl. 198—203)

This invention relates to conveying apparatus and more definitely to conveyors including pneumatic or inflated rotatable members employed in conjunction therewith.

The invention is particularly applicable to conveying systems which include a wide flexible rubber conveying belt which is adapted to carry loose material, such as sand, gravel, coal, minerals or the like, also packages, boxes etc. from one point to another.

Heretofore in conveying apparatus of this type it has been customary to place idler rollers beneath the conveyor belt at the loading points, which idler pulleys will support the flexible conveyor belt as the material is loaded thereon. In employing metal idler rollers beneath the conveyor belt at the loading point, considerable difficulty has been experienced, in that the material as it is loaded upon the belt tends to cut or crush the belt against the idler rollers, which fact materially lessens the life of the belt. If the idler rollers are placed so that they do not come directly beneath the place where the material is loaded upon the belt, the belt is not properly supported as the material is loaded thereon, with a consequent elongation and stretch of the belt which also lessens the life thereof.

Moreover in conveying systems of this general type which include bucket elevators, pieces of material will often fall upon the under or returning side of the conveyor belt, which material will then be carried between the driving or tail pulleys and the belt so that there will be a tendency for the material to be punched into the belt, with a resultant cutting or fracture of the conveyor belt. This is due to the normally close contact established between the belt and the conveyor pulley which is caused by the tension in the belt itself.

One object of the present invention is to overcome the foregoing disadvantages of prior known types of conveying systems by providing conveying apparatus including inflated or pneumatic rollers or pulleys, which are placed in the conveying system so as to eliminate cuts or bruises on the conveyor belt.

Another object of the invention is to provide a conveying apparatus wherein the conveyor belt is supported adjacent the material loading station upon pneumatic or inflated rollers.

Another object of the invention is to provide a conveying system wherein the head or tail pulleys or the driving pulley are formed with a pneumatic or inflated outer periphery so that any material passing between the belt and the pulley will not be punched into the belt but will be forced into the more resilient and pneumatic portion of the pulley.

Another object of the invention is to provide a conveyor mechanism wherein the conveyor belt is supported upon resilient, cushioned rotatable members which are adapted to yield to the weight of any objects passing along on the conveyor belt whereby the objects carried will not be jarred at every idler roller but will be carried smoothly throughout their travel.

Another object of the invention is to provide a pneumatic pulley which is simple, inexpensive, and rugged in construction, and which will function over long periods without attention.

Another object of the invention is to provide a rotatable member comprising a hub portion having a plurality of independent resilient cushions thereon, which may take the form of the plurality of doughnut or airwheel tires placed thereon in side by side relation.

Another object of the invention is to provide a conveyor system wherein the conveyor belt is carried in a trough-like position by a plurality of sets of rollers, which rollers are of the cushion pneumatic type.

Another object of the invention is to provide a rotatable member having an inflatable cushion in which the supporting bearings for the member are placed inwardly of the ends so that a plurality of the members may be mounted in units of two, three, five, etc., in such a way that there will be very little clearance between the ends of the rollers adjacent the conveyor belt.

For a better understanding of the invention, reference may now be had to the accompanying drawings forming a part of this specification, in which:

Fig. 1 is a side elevational view of a conveyor system embodying the principles of the present invention;

Fig. 2 is a cross-sectional view, on a larger scale, taken on line II—II of Fig. 1;

Fig. 5 is a side elevational view of another type of conveyor apparatus illustrating the application of the invention thereto;

Fig. 6 is a longitudinal cross-sectional view of a rotatable member embodying the invention;

Fig. 7 is a cross-sectional view taken on line VII—VII of Fig. 6;

Fig. 8 is a longitudinal cross-sectional view of

Fig. 9 is an end elevation of the member shown in Fig. 8;

Fig. 10 is a longitudinal cross-sectional view of another form of inflated roller or pulley, which comprises a plurality of doughnut or airwheel tires placed in side by side relation on a single hub;

Fig. 11 is a longitudinal cross-sectional view of another form of inflated pulley or roller; and Fig. 12 is a longitudinal cross-sectional view of another form of pneumatic roller or pulley.

Figure 3:
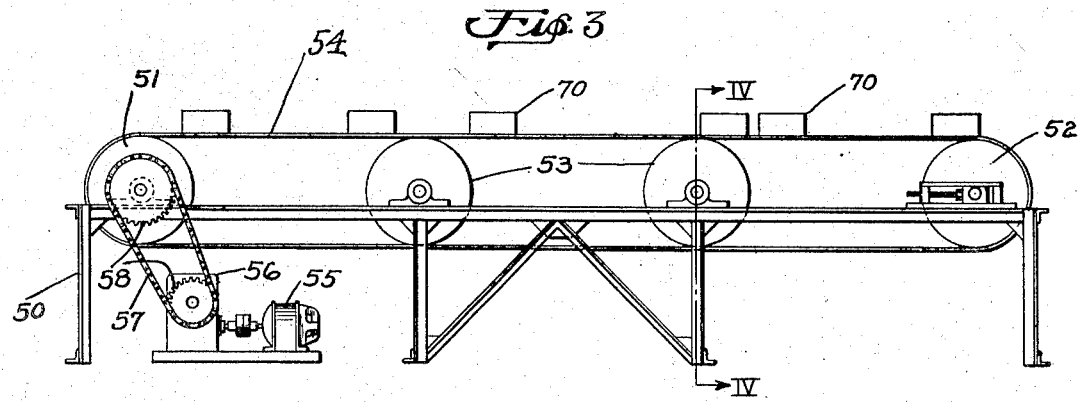
Fig. 3 is a side elevational view of another type of conveyor mechanism embodying the principles of the invention.

The conveying system illustrated in Figs. 1 and 2 is particularly adapted and designed to convey loose material, such as gravel, rocks, coal, or the like, from one point to another, as is oftentimes necessary in construction work of various sorts or in material handling and loading. The apparatus comprises a frame 15 upon which is journaled a head drive pulley 16 and a tail pulley 17, over which is trained a wide flat conveyor belt 18. The drive pulley 16 may be rotated by any suitable means, such as a motor 21, operating through reduction mechanism 22 and chain 23, which is trained over sprockets 24 and 25 upon the reduction mechanism and driving pulley respectively.

The conveyor belt 18 is supported throughout its upper travel by a plurality of sets of rollers 31, which are mounted upon suitable framework to slidably support the belt 18 in a trough-like position, such as illustrated in Fig. 2.

The material to be carried is loaded upon the belt 18 by any suitable means, which preferably comprise a chute 32 superimposed above the conveyor belt. Closely supporting the belt 18 at both sides of the chute 32 are inflated idler rollers 33 which are mounted in units of three as illustrated in Fig. 2, thus supporting the belt in a trough-like position. The rollers 33 are journaled upon suitable arms 34 mounted upon the frame-work 15 in such a manner that the ends of the rollers adjacent the belt 18 are very close together, so that the belt will be be supported throughout its entire width.

In order to place the rollers closely together in this manner, it is desirable to mount the rollers upon bearings which are placed inwardly of the ends of the rollers. Rollers constructed in this manner may take a plurality of forms. However Figs. 6 and 7 illustrate a particular embodiment of a roller of this type. The roller comprises an axle 40 upon which are mounted spaced roller bearings 41 which serve to journal a housing 42. Mounted upon the housing 42 and retained in place thereon by suitable flanges 43, is a cylindrical bag 44 of flexibly air tight material. The bag 44 is preferably constructed of rubberized fabric and is provided with a valve stem 45 whereby the bag may be inflated to any desired pressure.

The bag 44 may be slightly crowned or not, as desired, and preferably extends over the ends of the flanges 43, as indicated at 46, so that the bag gives a resilient cushioning action over the entire periphery of the roller.

In the operation of the conveyor mechanism just described the material to be carried upon the belt 18 is passed thereto by way of the chute 32, so that the material will strike the conveyor belt where it is supported between the spaced sets of rollers 33. Inasmuch as the rollers 33 are pneumatic and resilient, any large portions or bodies of the material striking heavily against the belt over or adjacent the rollers 33 will not tend to crush or cut the conveyor belt, because the inflated rollers 33 will resiliently cushion the shock. The inflated bag 44 upon the rollers 33 can be easily removed for repair if necessary by removing the flanges 43 which are secured by bayonet pivot slot connections or other suitable means upon the ends of the housing 42.

While the conveyor has been described and illustrated as including a flexible belt held in a trough shape by sets of three rollers, it will be evident that the invention contemplates employing inflated rollers with belts which are held in trough shape by any number of rollers in a set, and that it also contemplates using inflated rollers with flat belts. Moreover, if the material is drawn on the conveyor at a number of different points, it is within the province of the invention to provide pneumatic rollers at any such points or along the entire upper stretch of the conveyor.

Again the exact construction of the inflated roller can be widely varied in accordance with the various forms of rollers illustrated in the drawings without departing from the principles of the invention.

Figure 4:
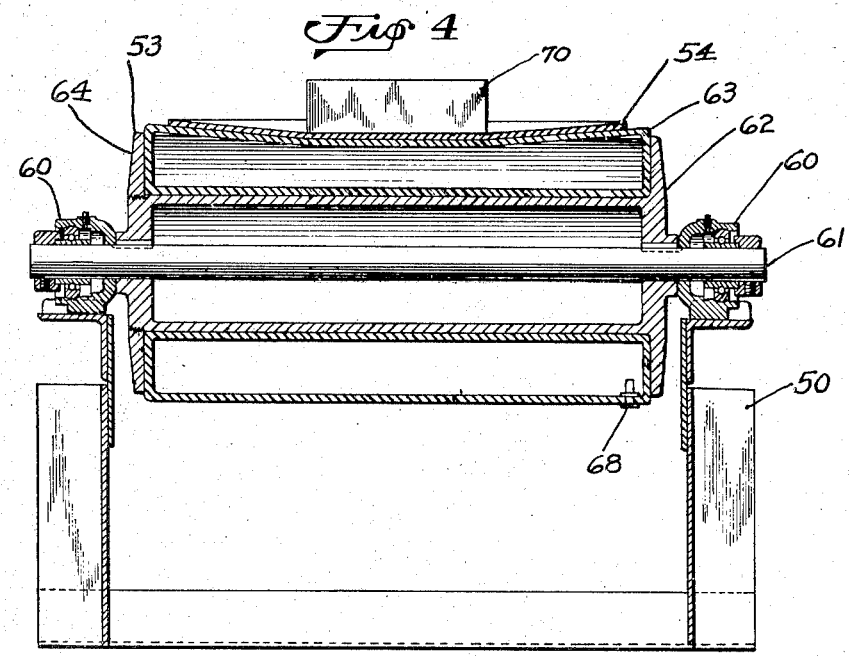
Fig. 4 is a cross-sectional view, on a larger scale, taken on line IV—IV of Fig. 3.

The conveyor system illustrated in Figs. 3 and 4 is particularly designed to carry articles from one place to another, and comprises a frame 50 upon which are journaled a driving pulley 51 and a tail pulley 52 and a plurality of idler rollers 53, all of which serve to support and carry a flat flexible conveyor belt 54. The driving pulley 51 is driven by any suitable mechanism such as a motor 55 operating through a reduction gear unit 56, which is connected to the driving pulley through the agency of a chain 57 and sprockets 58 mounted upon the driving pulley and the reduction gear unit respectively.

In this form of the invention, it is not necessary to employ idler rollers and pulleys in which the bearings are placed inwardly of the ends, and therefore the members are designed as shown in Fig. 4 with outboard bearings 60 secured to the frame 50. The bearings 60 rotatably support a shaft 61, upon which is mounted a drum 62, which serves to support a resilient flexible bag 63. The drum 62 is supplied with an end flange 64, which can be removed to permit the removal of the bag 63. The bag 63 is provided with a valve 68, whereby any desired pressure may be applied to the interior of the bag. As distinguished from the valve 45 incorporated in the roller, illustrated in Figs. 6 and 7, the valve 68 is placed in the outer periphery of the bag 63 and is made with a flat outer surface so that it will not interfere with the passage of the conveyor belt. It will thus be seen that the valve in the inflated bag can be placed in a number of different positions in the various types of rollers and pulleys.

In passing articles along the conveyor, such as those indicated at 70, it will be seen that the articles as they pass over the idler rollers will cause the idler rollers to give slightly, as indicated in Fig. 4, so that a very smooth cushioned passage is provided for the articles 70.

In Fig. 5 is illustrated an elevator conveyor which is adapted to carry material from one level to another, load and unload trucks and the like. The elevator comprises a main frame 75 and a drive pulley 76 which is preferably journaled at the upper end of the frame 75, and a tail pulley 77 journaled at the bottom of the frame 75. The pulleys 76 and 77 support and drive a conveyor belt 78 upon which are mounted a plurality of buckets 79. The belt 78 is supported between the drive and tail pulleys by a plurality of idler rollers 80 journaled upon the frame 75. In this type of conveyor or elevator the tail pulley 77 comprises an inflated resilient roller, which may take the form of any of those illustrated in Figs. 4, 6, 7, 8, 9, 10 and 11.

In the operation of the elevator any material falling down upon the return portion of the conveyor belt 78 and thus tending to pass between the tail 77 and the belt 78, will thus be depressed into the resilient periphery of the pulley 77 and will not tend to be punched into the belt 78. In this manner the belt 78 is not subjected to any severe cuts or bruises, such as are normally occasioned by material passing between a conveyor belt and the ordinary metal tail pulley.

It will be understood that the inflated resilient tail pulley may be placed upon any of the other forms of conveyor mechanism shown in the accompanying drawings, where it will function in a manner similar to that above described.

Moreover, the invention contemplates replacing the driving pulley or the head pulley with inflatable cushioning pulleys or rollers, in which positions they will function to give an improved conveying system, wherein the conveyor belt is cushioned so that cuts and bruises are greatly reduced and wherein the articles or material conveyed can be cushioned and resiliently supported with a minimum of breakage during loading and travel.

The form of the inflated pulley illustrated in Figs. 8 and 9 is similar to that illustrated in Fig. 4 and described above, with the exception that the bearings 60ª are placed inwardly of the ends of the pulley. The valve 68ª connected to the inflatable bag 63ª is also placed so as to extend through the end of the drum 62ª.

Referring to Fig. 10, the inflated pulley may comprise a shaft 85, upon which are mounted a pair of roller bearings 86 which serve to journal a drum 87. The drum 87 is formed with an integral end flange 88 and a removable end flange 89, between which are positioned a plurality of inflatable cushion elements, which may take the form of conventional automobile or aeroplane tires 90. Air is individually supplied to the tires 90 by suitable conduits not shown. The conveyor belt is indicated at 91, it being understood that the inflatable roller or pulley can be used in any of the various relations described heretofore.

The form of the inflated pulley, illustrated in Fig. 11, comprises a shaft 95, which is journaled at its ends in bearings 96, which are adapted to be held in any suitable supporting means. Secured to the shaft 95 are cone-like hub flanges 97 which are adapted to support a flexible inflatable bag 98 upon the shaft 95.

Referring to Fig. 12 it will be seen that the invention includes a pneumatic roller in which the inflated element is secured at its ends to the ends of the roller axle. This roller may comprise an axle 101 upon the ends of which are mounted roller bearings 102 which serve to journal hubs 103 spaced by a tube 107. The bearings 102 are lubricated in any desired manner as by an axial opening 104 and a radial passage 105 and the open ends of the hubs 103 are closed by disks 106 so that the lubricant will be sealed in place.

The hubs 103 are each provided with a fixed flange 110 and a removable flange 111 which are adapted to clamp the ends of a cylindrical inflatable flexible member 112 in the manner illustrated in Fig. 12. A valve 115 is provided to allow the air pressure in the member to be controlled. The inflatable member 112 may be covered with a cylindrical wrapping or cover 116 to insure that the flexible member will be flat and cylindrical in contour. The numeral 118 indicates a conveyor belt employed in conjunction with the pneumatic roller.

From the foregoing it will be apparent that the invention has provided a distinct improvement in conveying apparatus by the provision of inflated rollers or pulleys which are placed to support, drive or turn conveyor belts in such a manner that the belt will not be subjected to cuts or bruises and so the material or articles conveyed will be smoothly cushioned and carried at all times. The invention contemplates employing inflated pulleys of various forms, which are adapted to serve in numerous and varied relations. Cutting or bruising of the belt by material falling upon it or by material passing between the belt and supporting or turning pulleys, is substantially eliminated.

It will be apparent that the various principles of the invention may be correlated in a unitary or single conveying system, and that moreover the principles of the invention are broadly applicable to conveyors of all types.

Although only the preferred forms of the invention have been shown and described in detail, it will be apparent to those skilled in the art that the invention is not so limited but that various modifications may be made therein without departing from the spirit of the invention or the scope of the appended claims.

What I claim is:
1. Conveying apparatus comprising a frame, a pair of substantially cylindrical pneumatic pulleys journalled adjacent the opposite ends of the frame, the surfaces of said pulleys being yieldable throughout their extent, and an endless conveyor belt trained over and between said pulleys, excess tension on the belt being relieved by yielding of the pulley surfaces.

2. In conveying apparatus, the combination with an endless flexible belt, of a pair of cylindrical pneumatic pulleys supporting the belt at opposite ends of the conveying apparatus, the surfaces of said pulleys being yieldable and thus adapted to distribute tension uniformly through the length of the belt and to absorb any excess of tension applied to the belt from any other means.

JOSEPH F. STEPHENS.